United States Patent [19]

Speedy

[11] 4,153,928

[45] May 8, 1979

[54] MOTOR VEHICLE TAIL LAMP ASSEMBLY

[75] Inventor: Guido C. Speedy, Anderson, Ind.

[73] Assignee: General Motors Corporation, Detroit, Mich.

[21] Appl. No.: 855,827

[22] Filed: Nov. 30, 1977

[51] Int. Cl.[2] .......................... F21V 5/04; F21V 13/00; B60Q 1/30

[52] U.S. Cl. .......................................... 362/331; 362/80; 362/337; 362/367; 362/300

[58] Field of Search ............... 362/297, 268, 300, 303, 362/307, 309, 311, 330, 331, 339, 360, 361, 367, 80, 337, 336

[56] References Cited

U.S. PATENT DOCUMENTS

| | | | |
|---|---|---|---|
| 1,310,378 | 12/1916 | Strauss | 362/307 |
| 3,487,206 | 12/1969 | Dawson et al. | 362/80 |
| 3,514,589 | 5/1970 | Huber | 362/293 |
| 4,041,302 | 8/1977 | Koljonen | 362/307 |

*Primary Examiner*—Howard A. Birmiel
*Attorney, Agent, or Firm*—E. J. Biskup

[57] ABSTRACT

A lens assembly for a motor vehicle tail lamp assembly that gives the latter the appearance of a substantially black lighting unit. The lens assembly includes an inner lens and an outer lens each of which is formed with horizontally extending V-shaped ribs with the outer lens being made of a neutral density plastic material while the inner lens is made of a colored plastic material and has each rib thereof consisting of a substantially horizontally oriented portion and an inclined portion.

3 Claims, 4 Drawing Figures

MOTOR VEHICLE TAIL LAMP ASSEMBLY

The invention concerns lighting units in general and more particularly relates to a lamp assembly for the rear end of a vehicle that is characterized in that it gives the appearance of a substantially black unit when de-energized.

More specifically, the invention concerns a lens assembly for a vehicle lighting unit which is attached to a housing provided with a reflector and a light bulb. The lens assembly comprises an outer lens and an inner lens aligned in series for light transmission with the outer lens being made of a neutral density plastic material having a light transmitting factor in the range of 30% to 70%, while the inner lens is made of a light transmitting plastic material that is colored, red, amber or white. A plurality of horizontal ribs are formed in the inner and outer lenses with each of the ribs being V-shaped when viewed in cross section and consisting of a substantially horizontally oriented portion and an inclined portion. The inclined portion is defined by a front planar surface and a rear planar surface while the horizontal portion is defined by an upper planar surface and a lower planar surface. A plurality of optical surfaces are formed on the rear planar surface of each of the ribs of the inner lens for directing the light emitted by the light bulb through the outer lens in a direction normally intercepted by a person viewing the lighting unit. The front planar surface of each of the inner lens' ribs lies in a plane which forms an included angle in the range of 25° to 35° with a vertical plane. The upper planar surfaces of the inner lens are a black color and the arrangement is such that the outer lens and the inner lens cooperate so as to give the appearance of a substantially black lighting unit when the light bulb is not lighted.

The objects of the present invention are to provide an improved motor vehicle tail lamp assembly for association with black colored body panels that incorporates horizontally ribbed and serially aligned lenses that cooperate to provide a lighting unit that is black in appearance when not illuminated; to provide an improved lighting assembly for the rear end of a motor vehicle that includes inner and outer rearwardly inclined lenses having similarly formed horizontal ribs with the inner lens being made of a colored light transmitting acrylic material and the outer lens being made of a neutral density light transmitting acrylic material; to provide a new and improved black appearing motor vehicle tail lamp assembly which has front and rear plastic lenses of different colors through which light rays from a light source are transmitted and which in cross section have a stepped configuration for enhancing the black appearance of the assembly when not illuminated; and to provide an improved lighting unit that appears black to an observer when it is not lighted and includes a housing having a light source combined with inner and outer lenses, the former of which has a plurality of V-shaped ribs which include vertically spaced and horizontally extending surfaces that are coated black.

Other objects and advantages of the present invention will be more apparent from the following detailed description when taken with the drawings in which.

Figure 1:
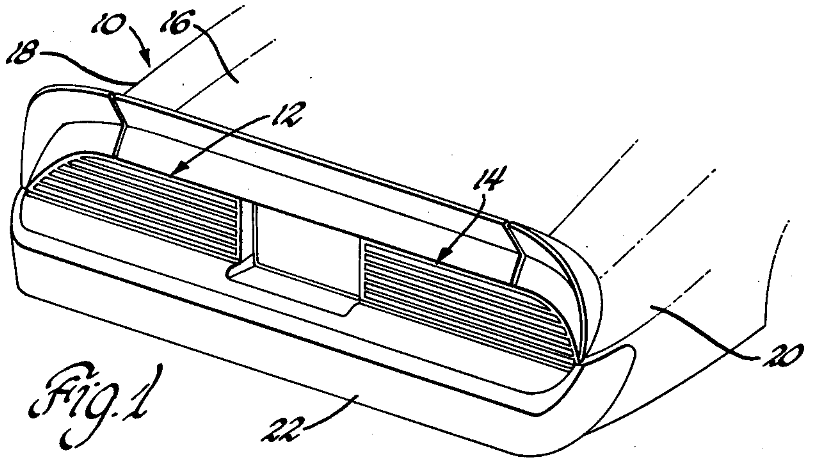
FIG. 1 is a perspective view of the rear end of a vehicle incorporating a pair of tail lamp assemblies made in accordance with the invention.

Referring to the drawings and more particularly FIG. 1 thereof, the rear end of a motor vehicle 10 is shown incorporating a pair of laterally spaced tail lamp assemblies 12 and 14 made in accordance with the invention and bordered by body parts of the vehicle such as a truck lid 16, rear fenders 18 and 20, and a bumper assembly 22.

Figure 3:
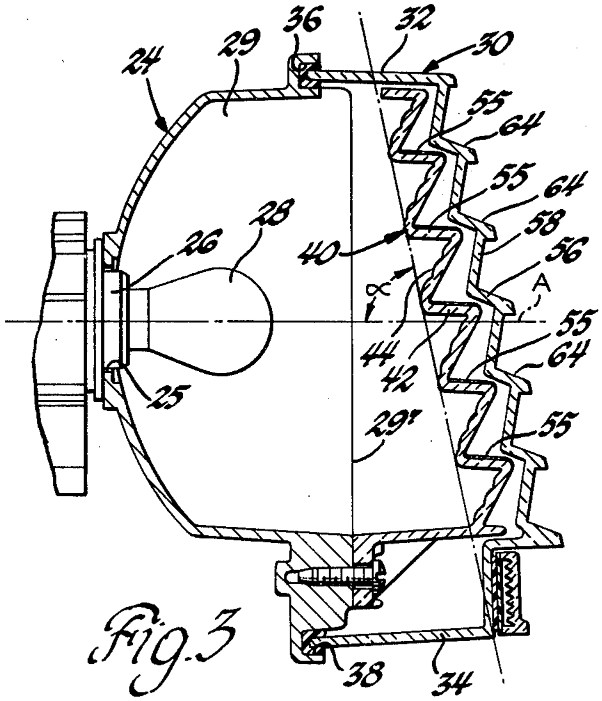
FIG. 3 is an enlarged sectional view of the tail lamp assembly seen in FIG. 2 taken on lines 3—3 thereof.

The tail lamp assemblies 12 and 14 are identical in construction but mirror images of each other and as seen in FIG. 3 each of the tail lamp assemblies includes a parabolic reflector 24 which serves as a housing having a plurality of suitable circular openings 25 provided therein. The openings 25 are horizontally spaced and adapted to removably receive lamp sockets which enter the interior of the housing from the rear end thereof. One of the lamp sockets is shown in FIG. 3 and is identified by reference numeral 26. The lamp socket 26 supports a light bulb 28 which when energized serves to emit light rays that are directed outwardly by the reflector 24.

Figure 2:
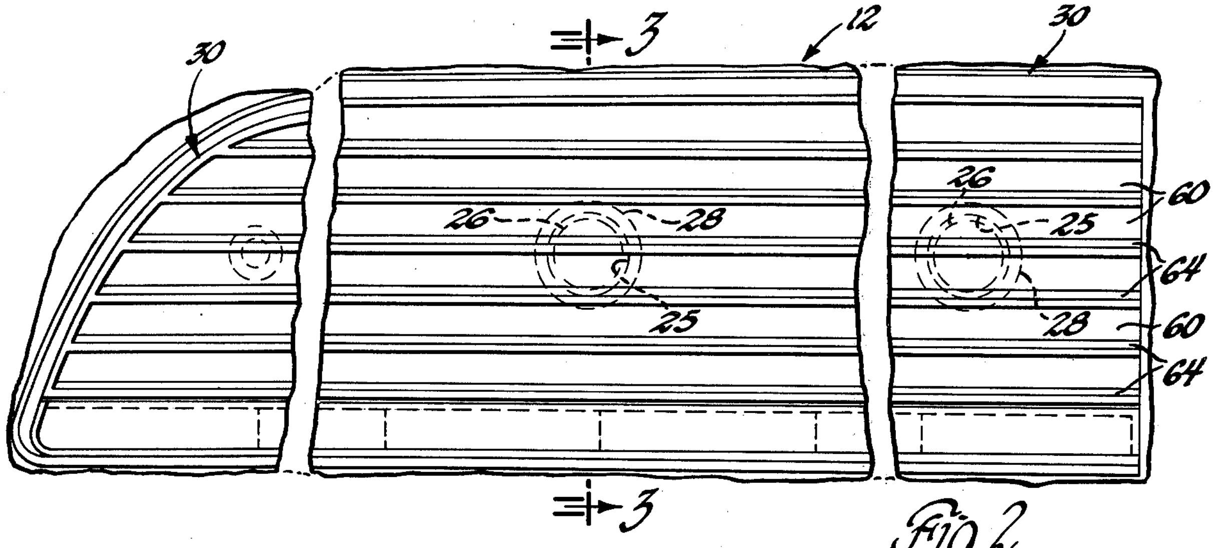
FIG. 2 is an enlarged elevational view of one of the tail lamp assemblies incorporated with the vehicle of FIG. 1.

The body of the reflector 24 is closed at its opposite sides by side walls one of which is shown in FIG. 3 and indicated by the reference numeral 29. The side wall 29 has a straight vertical edge 29′ which is perpendicular to the longitudinal center axis "A" of the light bulb 28 and the tail lamp assembly. The open end of the reflector 24 is closed by an outer lens member 30 which has its main body portion formed with a plurality of horizontally extending ribs seen in FIG. 2 that are V-shaped when viewed in cross section as seen in FIG. 3. The outer lens member 30 is secured to the reflector 24 by a plurality of fasteners, not shown, and is integrally formed at its upper and lower edges with rearwardly extending portions 32 and 34 which respectively fit into seal accommodating grooves 36 and 38 formed in the reflector. Thus, the tail lamp assembly is sealed so as to prevent dirt and other foreign particles from entering the interior of the housing.

An inner lens member 40 is positioned adjacent and to the rear of the outer lens member 30 and is similarly formed with horizontally extending ribs which in cross section are V-shaped as seen in FIG. 3. It will be noted that lens member 40 is coextensive with lens member 30, and as in the case with the outer lens member 30, the ribs formed in the inner lens member 40 extend the full longitudinal length thereof. In addition, the reflector 24 has the rear portion formed with a plurality of rearwardly extending bosses (not shown), each of which has a bore that fixedly receives a threaded fastener for rigidly securing the tail lamp assembly to the body of the vehicle 10.

Figure 4:
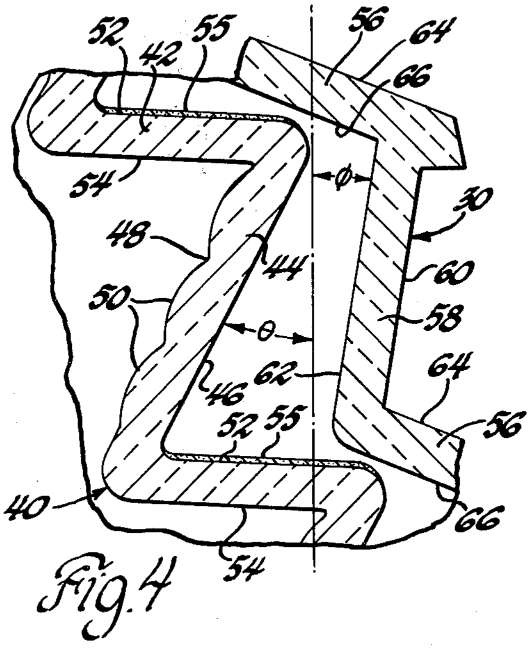
FIG. 4 is an enlarged view of adjacent ribs formed in the inner and outer lens members.

As seen in FIG. 4, each of the ribs formed with the inner lens member 40 comprises a horizontally oriented portion 42 and a forwardly inclined portion 44 that is integral therewith. The inclined portion 44 has a front planar surface 46 and a parallel rear planar surface 48, the former of which faces the outer lens member 30 while the latter faces the reflector 24 and is formed with a plurality of convex optical surfaces 50 of conventional design which direct light emitted by the light bulb 28 through the outer lens member 30 in a direction normally intercepted by a person viewing the tail lamp assembly. The front planar surface forms an angle $\theta$ with a line that is perpendicular to the axis A, and preferably this angle θ should be in the range of 25° to 35°. The horizontally oriented portion 42 has an upper planar surface 52 and a parallel lower planar surface 54 and is of a length slightly less than the length of the inclined portion 44. The inner lens member 40 is preferably made of the usual acrylic plastic material which transmits light and can be a red, amber or crystal color. In this case, the entire area of the upper planar surface 52 of the portion 42 is coated with a black paint 55 of a type that will adhere to the plastic material and prevent light rays from passing through this portion of each of the ribs.

The outer lens member 30 similarly has each of the ribs thereof defined by a substantially horizontally oriented portion 56 and a forwardly inclined portion 58. The lens member 30 is also made of an acrylic plastic material and preferably is a neutral density filter of a gray color having a light transmitting factor in the range of 40% to 70%. The forwardly inclined portion 58 of the outer lens member 30 is located in horizontal alignment with the inclined portion 44 of the inner lens member 40, and the juncture between the portions 56 and 58 is horizontally in line with the juncture between the portions 42 and 44. The junctures, when connected by a straight line "B", form an angle α with the axis A. The inclined portion 58 has parallel front and rear planar surfaces 60 and 62 while portion 56 has upper and lower planar surfaces 64 and 66. The rear planar surface 62 forms an angle φ with the aforementioned line which is perpendicular to the axis A. This arrangement of the ribs of the lens members 30 and 40 serve to provide a plurality of quadrilaterals each of which is formed by the planar surfaces 46, 52, 62 and 66 as seen in FIG. 4.

When the tail lamp assembly is constructed with an inner and outer lens arrangement as described above, it has been found that during daylight hours it has the appearance of a black lighting unit to the observer. When the light bulb in the tail lamp assembly is energized, however, the outer lens member 30 allows the color of the inner lens member 40 to be directed therethrough and be visible to the observer. In this manner, if the body panels surrounding the tail lamp assemblies 12 and 14 are painted black, the tail lamp assembly are in effect concealed and the vehicle appears to have an uninterrupted smooth exterior appearance.

A tail lamp assembly having a lens arrangement such as described above, has been constructed and successfully tested and had a plastic inner lens member 40 made of red acrylic material manufactured by Rohm & Haas and identified as V-461. The thickness of the inner lens member 40 was approximately 2.5 mm and had conventional optics formed thereon, while the thickness of the outer lens member 30 was approximately 3 mm. The outer lens member 30 was made by Rohm & Haas and was selected from its "Plexiglas Solar Control Series" and identified as R&H gray #2514 which gave a 59% transmittance of visible light. As seen in FIG. 4, the inclined portion 44 of the inner lens member 40 had a length of 20 mm and the horizontal portion had a length of 15 mm. The inclined portion 58 of the outer lens member 30 had a length of 15 mm and the horizontal portion 56 measured 10 mm. The angle θ was 30° while the angle φ was 9°. The lower surface 66 formed an included angle of 20° with axis A. Both lens member 30 and 40 were stepped rearwardly as indicated by the angle α and this angle measured 76°.

A tail lamp assembly when made in accordance with the invention allows the inner lens member 30 to be positioned closer to the outer lens member 40 without greatly increasing the depth of the lamp. Moreover, the angled stepped inner lens design enhances the darkness of the unlighted appearance. In addition, it has been found that the use of bezels with horizontal bars or black painted ribs which would simulate the ribs formed in the outer lens member 30 can be used with a straight outer lens member and obtain the desired darker appearance.

Various changes and modifications can be made in this construction without departing from the spirit of the invention. Such changes and modifications are contemplated by the inventor and he does not wish to be limited except by the scope of the appended claims.

What is claimed is:

1. A lens assembly for a vehicle lighting unit that includes a housing provided with a reflector and a light bulb, said lens assembly comprising an outer lens and an inner lens connected to said housing opposite said reflector, said outer lens being made of a neutral density plastic material having a light transmitting factor in the range of 30% to 70%, the inner lens being located adjacent the outer lens and being made of a colored plastic material, said inner and outer lenses having a plurality of horizontal ribs, each of said ribs of said inner lens being V-shaped and consisting of a substantially horizontally oriented first portion and an inclined second portion, said inclined second portion having a front planar surface adjacent the outer lens and a rear planar surface facing said refelector, a plurality of optical surfaces formed on the rear planar surface for directing light emitted by said light bulb through said outer lens in a direction normally intercepted by a person viewing said lighting unit, the front planar surface lying in a plane which forms an included angle in the range of 25° to 35° with a vertical plane, said first portion having an upper planar surface and a lower planar surface, one of said planar surfaces of said first portion being coated with a dark color so as to render it opaque, said outer lens and said inner lens together with said coated planar surface cooperating so as to give the appearance of a substantially black lighting unit when said light bulb is not lighted while allowing the color of the inner lens to be transmitted through the outer lens when the light bulb is lighted.

2. A lens assembly for a vehicle lighting unit that includes a housing provided with a reflector and a light bulb, said lens assembly comprising an outer lens member, and an inner lens member connected to said housing opposite said reflector, said outer lens member being made of a neutral density plastic material having a light transmitting factor in the range of 30% to 70%, the inner lens member being located adjacent the outer lens member and being made of a colored plastic material, said inner and outer lens members having a plurality of horizontal ribs in stepped form with each of said ribs being V-shaped when viewed in cross section, each of said ribs having a substantially horizontally oriented first portion and an inclined second portion, said inclined second portion having a front planar surface and a rear planar surface, a plurality of optical surfaces formed on the rear planar surface of said inner lens member for directing light emitted by said light bulb through said outer lens member in a direction normally intercepted by a person viewing said lighting unit, the front planar surface of said inner lens member lying in a plane which forms an included angle in the range of 25° to 35° with a vertical plane, said first portion of said lens members having an upper planar surface and a lower planar surface, said upper planar surfaces of said inner lens member being coated with a dark color so as to render it opaque, said outer lens member and said inner lens member together with said coated planar surface cooperating so as to give the appearance of a substantially black lighting unit when said light bulb is not lighted while allowing the color of the inner lens to be transmitted through the outer lens when the light bulb is lighted.

3. A lens assembly for a vehicle tail lamp assembly that includes a housing provided with a reflector and a light bulb, said lens assembly comprising an outer lens and an inner lens positioned in series and connected to said housing opposite said reflector, said outer lens being made of a neutral density plastic material having a light transmitting factor in the range of 30% to 70%, the inner lens being made of a colored plastic material, a plurality of horizontal ribs formed in said inner lens and said outer lens with each of said ribs being V-shaped when viewed in cross section and consisting of a substantially horizontally oriented first portion and an inclined second portion, said inclined second portion having a front planar surface and a rear planar surface, a plurality of optical surfaces formed on the rear planar surface of said inner lens for directing light emitted by said light bulb through said outer lens in a direction normally intercepted by a person viewing said lighting unit, the front planar surface of said inner lens lying in a plane which forms an included angle in the range of 25° to 35° with a vertical plane, said first portion having an upper planar surface and a lower planar surface, said upper planar surfaces of said inner lens being coated with a dark color so as to render it opaque, said outer lens and said inner lens being positioned so that the front and upper planar surfaces of the inner lens and the rear and lower planar surfaces of the outer lens form a quadrilateral and give the tail lamp assembly the appearance of a substantially black lighting unit when said light bulb is not lighted while allowing the color of the inner lens to be transmitted through the outer lens when the light bulb is lighted.

* * * * *